(12) United States Patent
Razumov (10) Patent No.: US 9,187,245 B2
(45) Date of Patent: Nov. 17, 2015

(54) TRANSFERRING CONTAINERS IN STORAGE SYSTEM

(71) Applicant: Sergey N. Razumov, Moscow (RU)

(72) Inventor: Sergey N. Razumov, Moscow (RU)

(73) Assignee: Sergey N. Razumov, Moscow (RU)

( * ) Notice: Subject to any disclaimer, the term of this patent is extended or adjusted under 35 U.S.C. 154(b) by 117 days.

(21) Appl. No.: 14/155,976

(22) Filed: Jan. 15, 2014

(65) Prior Publication Data

US 2015/0197397 A1    Jul. 16, 2015

(51) Int. Cl.
*B65G 1/137* (2006.01)
*B65G 1/04* (2006.01)

(52) U.S. Cl.
CPC ............ *B65G 1/1373* (2013.01); *B65G 1/0492* (2013.01)

(58) Field of Classification Search
CPC .. B65G 1/1373; B65G 1/0492; B65G 1/0407; B65G 1/0464; B65G 1/065; B65G 1/0414; B66F 11/04; B66F 9/07
USPC .................................. 414/277, 281, 279, 282
See application file for complete search history.

(56) References Cited

U.S. PATENT DOCUMENTS

| | | | | |
|---|---|---|---|---|
| 3,428,195 | A | * | 2/1969 | Pamer ............................. 414/281 |
| 6,113,336 | A | * | 9/2000 | Chang et al. .................. 414/281 |
| 8,721,251 | B1 | * | 5/2014 | Razumov ....................... 414/281 |
| 2006/0285947 | A1 | * | 12/2006 | Hansl et al. .................... 414/277 |
| 2015/0098775 | A1 | * | 4/2015 | Razumov ....................... 414/282 |

FOREIGN PATENT DOCUMENTS

| | | | |
|---|---|---|---|
| DE | 3729139 | C1 | 10/1988 |
| DE | 3941754 | A1 * | 6/1991 |
| DE | 102012112828 | A1 * | 6/2014 |
| EP | 2746193 | A1 * | 6/2014 |
| JP | 06-72512 | A | 3/1994 |
| JP | 07-117815 | A | 5/1995 |
| WO | 03/010074 | A1 | 2/2003 |

OTHER PUBLICATIONS

International Search Report and Written Opinion issued in corresponding International Patent Application No. PCT/IB2014/002694, mailed on Jan. 23, 2015; 13 pages.

* cited by examiner

*Primary Examiner* — Kaitlin Joerger
(74) *Attorney, Agent, or Firm* — McDermott Will & Emery LLP (57) ABSTRACT

A storage system having first and second storage sections, each configured for storing containers arranged in multiple rows at various horizontal levels with respect to ground. A group of transportation devices is configured for moving in a horizontal direction along corresponding pairs of rails arranged at multiple horizontal levels in a passage between the first storage section and the second storage section so as to have access to the containers arranged in both the first and second storage sections. Each transportation device movable along a corresponding pair of rails is configured to include a container access mechanism movable up and down with respect to the corresponding pair of rails so as to handle one or more containers stored in a row above and below the corresponding pair of rails.

10 Claims, 8 Drawing Sheets

TRANSFERRING CONTAINERS IN STORAGE SYSTEM

TECHNICAL FIELD

This disclosure relates to retail logistics, and more particularly, to transferring containers in a multi-level storage system of a warehouse or a retail store.

BACKGROUND ART

Typical warehouse operations include handling and storage of products in order to efficiently receive inventory, store it, collect products from different containers to prepare orders, and ship orders to customers. Handling and storage of products in a storage system involve a number of in-storage inventory transfers performed within the warehouse. After containers with products are received and moved to an initial storing location, products are often moved within the facility for storage or order selection. Further, after an order for product shipment is received, it is necessary to collect the required products to fulfill the order and move orders to a shipping area.

Several transfer movements are required in a typical warehouse. First, products are moved from the receiving area to a remote storage location. Additional movements may be required prior to order assembly, depending upon warehouse operating procedures. To fulfill an order, products are usually transferred from a storage area to a picking area. Finally, prepared orders are moved from a picking area to a shipping dock for loading to outbound transportation means.

In traditional storage systems, transfer movements are carried out using a combination of lift trucks, conveyors, and manual processes. However, such transfer operations are slow, and involve complex logistics and substantial labor cost when a large number of orders must be processed.

Therefore, it would be desirable to develop storage systems capable of performing in-storage transfer operations in a quick and efficient manner.

SUMMARY OF THE DISCLOSURE

In accordance with one aspect, the present disclosure offers a storage system having first and second storage sections, each configured for storing containers arranged in multiple rows at various horizontal levels with respect to ground. A first group of transportation devices is configured for moving in a horizontal direction along corresponding pairs of rails arranged at multiple horizontal levels in a passage between the first storage section and the second storage section so as to have access to the containers arranged in both the first and second storage sections.

Each transportation device movable along a corresponding pair of rails is configured to include a container access mechanism movable up with respect to the corresponding pair of rails so as to handle one or more containers stored in a row above the corresponding pair of rails, and movable down with respect to the corresponding pair of rails so as to handle one or more containers stored in a row below the corresponding pair of rails.

The first group of transportation devices includes a first transportation device movable along a first pair of rails, and a second transportation device movable along a second pair of rails arranged above the first pair of rails.

The first transportation device is configured to access containers arranged in the first and second storage sections at a first set of rows, and the second transportation device is configured to access containers arranged in the first and second storage sections at a second set of rows provided above the rows of the first set.

The first set and the second set include a pre-determined number of rows common to the both first and second sets, the number of common rows is less than the number of rows in the first set and the number of rows in the second set.

In an exemplary embodiment, the system may also have a third storage section configured for storing containers arranged in multiple rows at various horizontal levels with respect to ground. A second group of transportation devices may be configured for moving in a horizontal direction along corresponding pairs of rails arranged at multiple horizontal levels in a passage between the second storage section and the third storage section so as to have access to the containers arranged in both the second and the third storage sections.

The second group of transportation devices may include a third transportation device movable along a third pair of rails arranged at a horizontal level corresponding to the first pair of rails, and a fourth transportation device movable along a fourth pair of rails arranged above the third pair of rails at a horizontal level corresponding to the second pair of rails.

The third transportation device may be configured to access containers arranged in the second and third storage sections at the first set of rows, and the fourth transportation device may be configured to access containers arranged in the second and third storage sections at the second set of rows.

For example, the first transportation device may be configured for loading a selected container from a first slot in a first row of the first storage section and unloading the selected container to a second slot in a second row of the second storage section, where the second row is a row common to the both first and second sets of rows. The second row may differ from the first row.

The fourth transportation device may be configured for loading the selected container from the second slot and unloading the selected container to a third slot in a third row of the third storage section, where the third row differs from the second row.

In accordance with exemplary implementation, each transportation device may include a frame movable along the corresponding pair of rails, and a movable platform configured to move up with respect to the frame to take a container arranged in a row above the corresponding pair of rails and configured to move down with respect to the frame to take a container arranged in a row below the corresponding pair of rails.

In accordance with another aspect, the present disclosure offers a method of transferring containers in a storage system including multiple storage sections, each configured for storing containers arranged in multiple rows at various horizontal levels with respect to ground, and at least one group of transportation devices configured for moving in a horizontal direction along corresponding pairs of rails arranged at various horizontal levels in a passage between adjacent storage sections so as to have access to the containers arranged in the adjacent storage sections, each transportation device in the group being configured for accessing containers arranged at a set of rows, adjacent sets of rows include a predetermined number of common rows less than the number of rows in each of the adjacent sets.

The method involves:
configuring a first transportation device in a first group of transportation devices for accessing containers arranged in first and second storage section at a first set of rows, and transferring a selected container by the first transportation device from a first row in a first set of rows in the first storage section to a second row in the second storage section common to the first set of rows and the second set of rows, where the second row differs from the first TOW.

Also, the method may involve:

configuring a second transportation device in a second group for accessing containers arranged in the second storage section and a third storage section at a second set of rows adjacent the first set of rows, and transferring the selected container by the second transportation device from the second row in the second storage section to a third row in the third storage section.

Additional advantages and aspects of the disclosure will become readily apparent to those skilled in the art from the following detailed description, wherein embodiments of the present disclosure are shown and described, simply by way of illustration of the best mode contemplated for practicing the present disclosure. As will be described, the disclosure is capable of other and different embodiments, and its several details are susceptible of modification in various obvious respects, all without departing from the spirit of the disclosure. Accordingly, the drawings and description are to be regarded as illustrative in nature, and not as limitative.

BRIEF DESCRIPTION OF THE DRAWINGS

The following detailed description of the embodiments of the present disclosure can best be understood when read in conjunction with the following drawings, in which the features are not necessarily drawn to scale but rather are drawn as to best illustrate the pertinent features, wherein.

DETAILED DISCLOSURE OF THE EMBODIMENTS

The present disclosure will be made using exemplary storage environment discussed below. It will become apparent, however, that the concept of the disclosure is applicable to any storage system configured for performing in-storage transfer operations.

Figure 1:
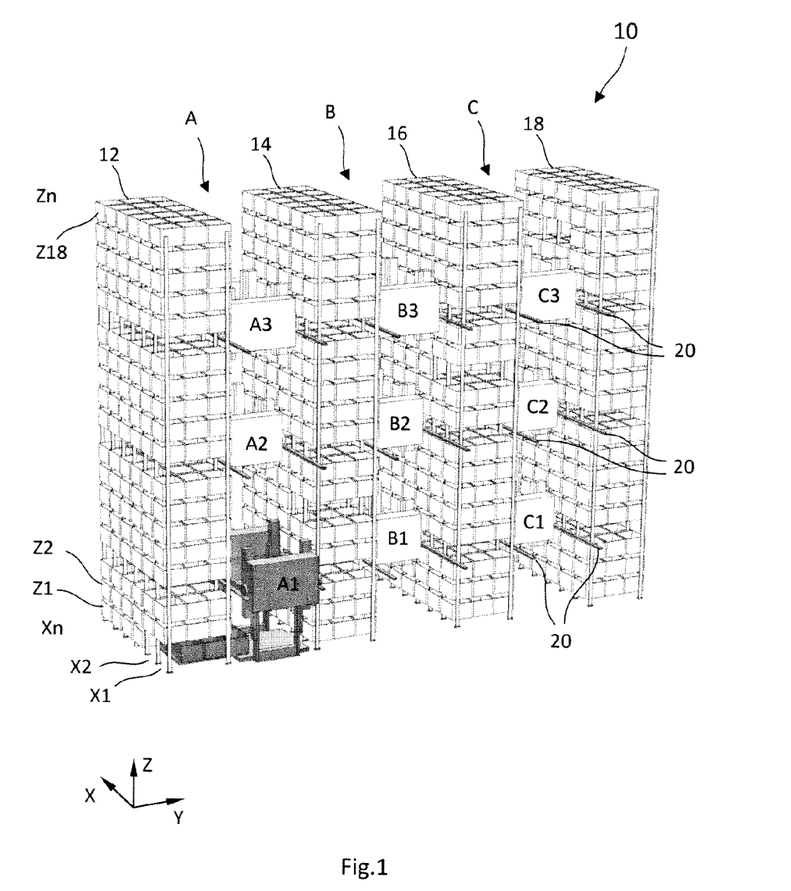
FIG. 1 shows an exemplary embodiment of a storage system in accordance with the present disclosure.

FIG. 1 illustrates an exemplary embodiment of a storage system 10 in accordance with the present disclosure. The storage system 10 may be arranged in a warehouse or retail facility for storing products to be shipped to customers per their orders. The storage system 10 may include not only a storage area, but also a picking area in which products are collected to fulfill customers' orders.

The storage system 10 may include storage racks 12, 14, 16 and 18, each of which is configured for storing containers arranged in a vertical direction (the Z-axis in FIG. 1) in multiple rows at various horizontal levels with respect to the ground. For example, FIG. 1 shows containers arranged in 18 rows from Z1 to Z18. The containers may be any objects capable of holding goods stored in the storage area, such as cartons, boxes, crates, or pallets.

As shown in FIG. 1, each row of the storage rack may contain multiple containers arranged in two mutually perpendicular horizontal directions (the X- and Y-axes in FIG. 1). The storage racks 12, 14, 16 and 18 may be arranged so as to provide passages A, B and C between adjacent racks. A group of transportation devices may be provided in each of the passages A, B and C to handle containers stored in a pair of section racks from both sides of the corresponding passage. For example, transportation devices A1, A2 and A3 may be arranged in the passage A between the storage racks 12 and 14 to handle containers stored in these racks, transportation devices B1, B2 and B3 may be arranged in the passage B between the storage racks 14 and 16, and transportation devices C1, C2 and C3 may be arranged in the passage C between the storage racks 16 and 18.

The transportation devices of each group are configured for moving in a horizontal direction (the X-axis in FIG. 1) along corresponding pairs of rails 20 arranged at multiple horizontal levels in each passage so as to have access to containers arranged in storage racks on both sides of the passage. In particular, the rails 20 provided for the transportation devices A1, B1 and C1 are arranged below the rails 20 provided for the transportation devices A2, B2 and C2, and the rails 20 provided for the transportation devices A3, B3 and C3 are arranged above the rails 20 for the transportation devices A2, B2 and C2.

As discussed in more detail below, each transportation device includes a frame movable along a selected pair of rails and a movable platform configured to move up and down with respect to the frame so as to handle containers arranged in a set of rows provided above and below the corresponding pair of rails 20. The set of rows may include a pre-selected number of rows. In particular, a transportation device may load a container from a selected row of a set assigned to the transportation device, and may unload that container to another row of the same set. The container may be loaded from one storage section served by the transportation device and unloaded to the other storage section served by the transportation device. Alternatively, the container may be unloaded to the same storage section from which the container is taken.

In particular, transportation devices A1, B1 and C1 are configured to handle containers stored in a first set of rows, transportation devices A2, B2 and C2 are configured to handle containers in a second set of rows provided above the first set of rows, and transportation devices A3, B3 and C3 are configured to handle containers in a third set of rows provided above the second set of rows. The number of rows in each set may be selected based on the size of the storage racks and the number of available transportation devices in each passage. The sets may have different numbers of rows.

Each adjacent pair of sets has a predetermined number of rows common to both sets. The number of common row is less than the number of rows in the corresponding sets. For example, at least one row of containers is handled by transportation devices A1, B1 and C1, as well as transportation devices A2, B2 and C2. Also, at least one row of containers is handled by transportation devices A2, B2 and C2, as well as transportation devices A3, B3 and C3.

Although FIG. 1 shows the storage system 10 including 3 groups of transportation devices with 3 transportation devices in each group, the concept of the present disclosure is applicable to any number of groups and any number of transportation devices in each group, including transportation devices arranged in a single group in the storage system having a single storage rack.

Figure 2:
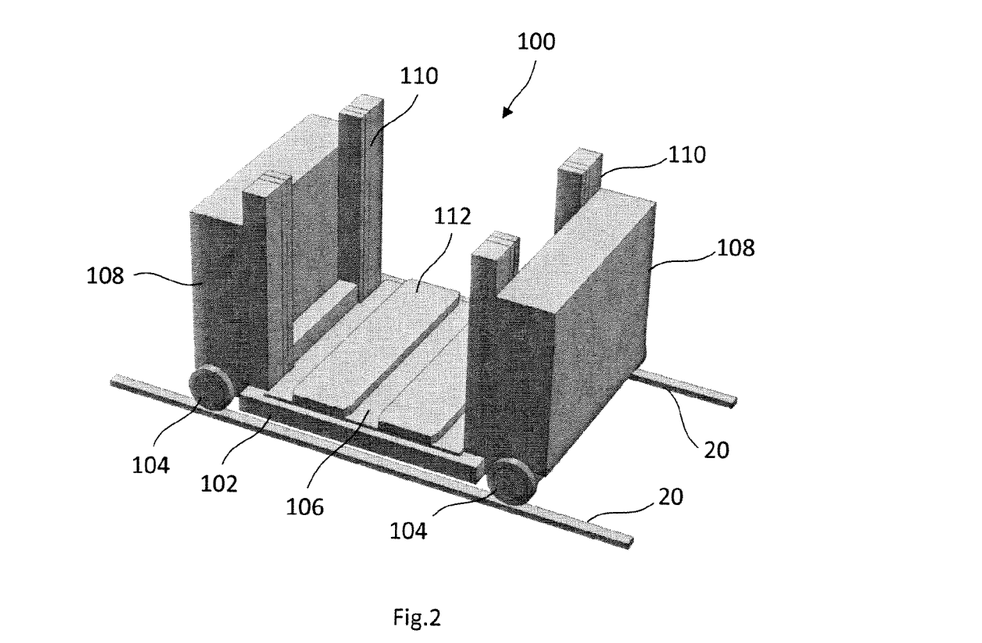
FIGS. 2-5 illustrate an exemplary transportation device that may be used in the storage system of the present disclosure.

FIGS. 2-5 schematically illustrate an exemplary embodiment of the transportation device that may be used in the storage system 10. As shown in FIG. 2, a transportation device 100 may include a frame 102 with four wheels 104 fixed to the frame 102 which may be formed as a braced structure for supporting elements required to operate the transportation unit 100. Each wheel 104 may be attached to the frame 102 so as to rotate in a vertical plane about an axis extending from the center of the wheel 104 in order to move the transportation unit 100 along the rails 20.

The frame 102 may hold a movable platform 106 that can be used for carrying containers. For example, the platform 106 may be a rectangular metal plate configured to accommodate containers. Side walls 108 may be provided on the frame 102 to support loading and carrying containers.

As discussed in more detail below, the platform 106 may move in a vertical direction up and down with respect to the frame 102 so as to access containers arranged in rows above and below the level at which the rails 20 are arranged. A platform lifting mechanism 110 may be arranged at the side walls 108 to move the platform 106 in a vertical direction. The platform lifting mechanism 110 may be implemented using any well-known mechanisms for moving a plate up and down. For example, a telescopic mechanism can be utilized.

One or more handling elements 112 may be mounted on the platform 106 and configured for operating with containers. The handling elements 112 may take one or more containers from one row of the storage rack, place the container onto the transportation unit 100 for carrying to another row, and remove the container from the transportation device 100 for placing it at a selected row. The handling elements 112 may be extended in a horizontal direction from one or both sides of the transportation device 100 so as to handle containers arranged at one storage rack or both storage racks served by the transportation device 100. For example, the handling elements 112 may be implemented as a metal plate, spade, fork or pulling device.

Figure 3:
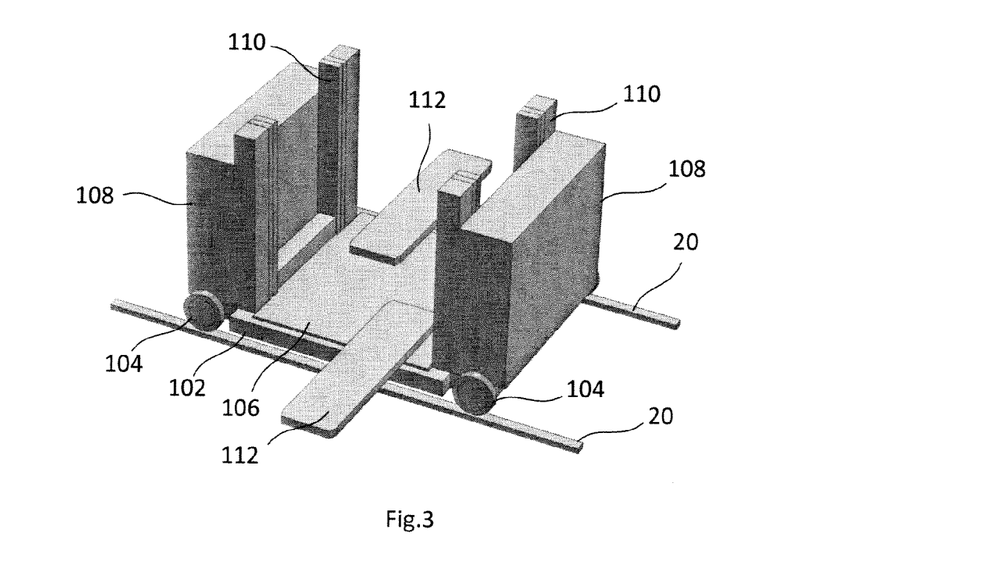
Figure 4:
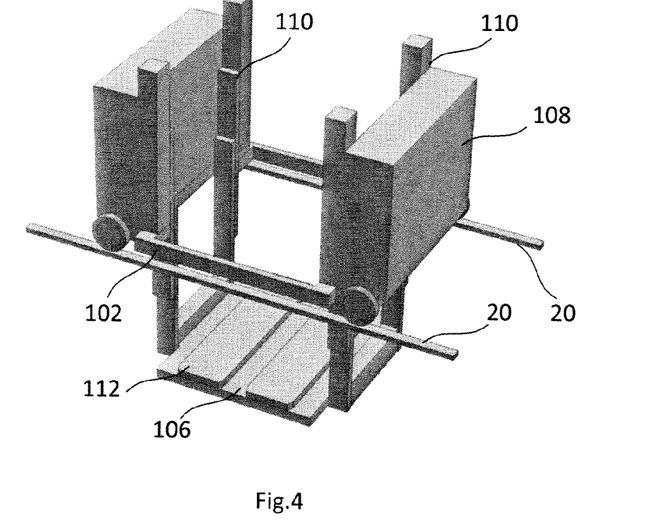
Figure 5:
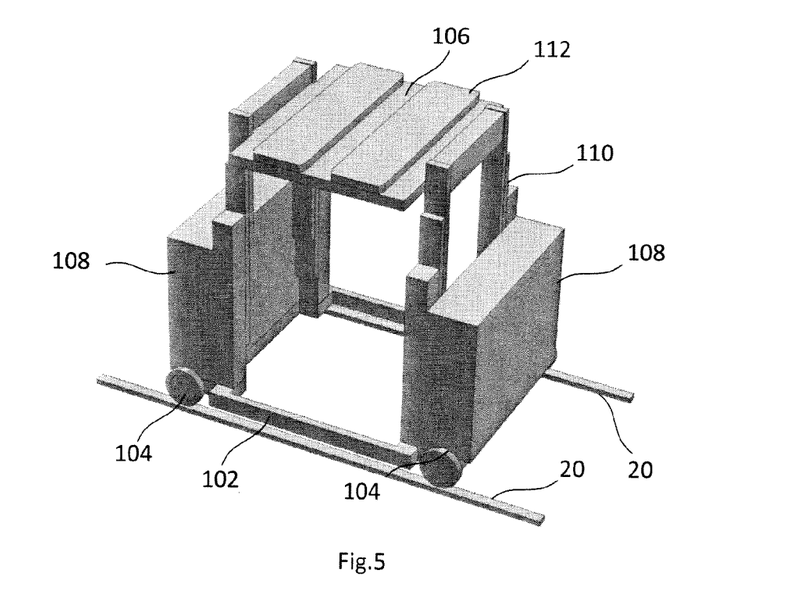

FIG. 3 illustrates the transportation device 100 with the handling elements 112 extended from both sides of the transportation device 100. FIG. 4 illustrates the transportation device 100 with the movable platform 106 moved down with respect to the frame 102 so as to handle containers arranged in rows below the level of the corresponding rails 20. FIG. 5 illustrates the transportation device 100 with the movable platform 106 raised with respect to the frame 102 so as to handle containers arranged in rows above the level of the corresponding rails 20.

The operations of the transportation device 100 may be controlled by a controller that may include a data processor responsive to external commands for processing the commands and producing various control signals. The controller may communicate with various elements of the transportation unit 100 to supply control signals to the elements of the transportation unit 100 and receive responses.

FIGS. 2-5 show a transportation device having the wheels 104 attached at the lower portion of the frame 102. However, the wheels 104 may be attached at the upper portion of the frame 102 or at the middle portion of the frame 102. An exemplary transportation device that can be used in the storage system 100 is described in more detail in a copending U.S. patent application Ser. No. 14/049,552 filed on Oct. 9, 2013 and entitled "AUTOMATIC ORDER PICKING SYSTEM AND METHOD IN RETAIL FACILITY."

Due to ability of transportation devices to move the platform 106 up and down in a horizontal direction, adjacent transportation devices arranged at the same passage between storage racks can simultaneously operate with containers arranged at the same row which is common to the sets served by both transportation devices. For example, the transportation device A1 may load one or more container from a row common to the first and second set. At the same time, the transportation device A2 may unload one or more containers to the row common to the first and second set. To avoid interference between the transportation devices A1 and A2 when both of them cross the same point with respect to the X- and Y-axes, the platform 106 of the transportation device A1 may be moved down and/or the platform 106 of the transportation device A2 may be moved up. As a result, the storage system 10 can provide a high-speed transfer of containers from any slot of any of the storage racks to another slot of any of the storage racks.

FIGS. 1 and 6-10 illustrate an example of transferring selected containers from row Z1 in the storage rack 12 to row Z16 in the storage rack 18. As shown in FIG. 1, the transportation device A1 is moved along the rails 20 to the position of the selected containers along the Y-axis. When the required position is reached, the platform 106 of the transportation device A1 is moved down to a level corresponding to the row Z1 where the selected containers are stored. One or more handling elements 112 are extended to take one or more selected containers and place them on the platform 106. For example, as illustrated in FIG. 1, the transportation device A1 may use two handling elements 112 to load 6 containers arranged in the slots with coordinates X1,Y1,Z1; X1,Y2,Z1; X1,Y3,Z1; X2,Y1,Z1; X2,Y2,Z1; and X2,Y3,Z1.

Figure 6:
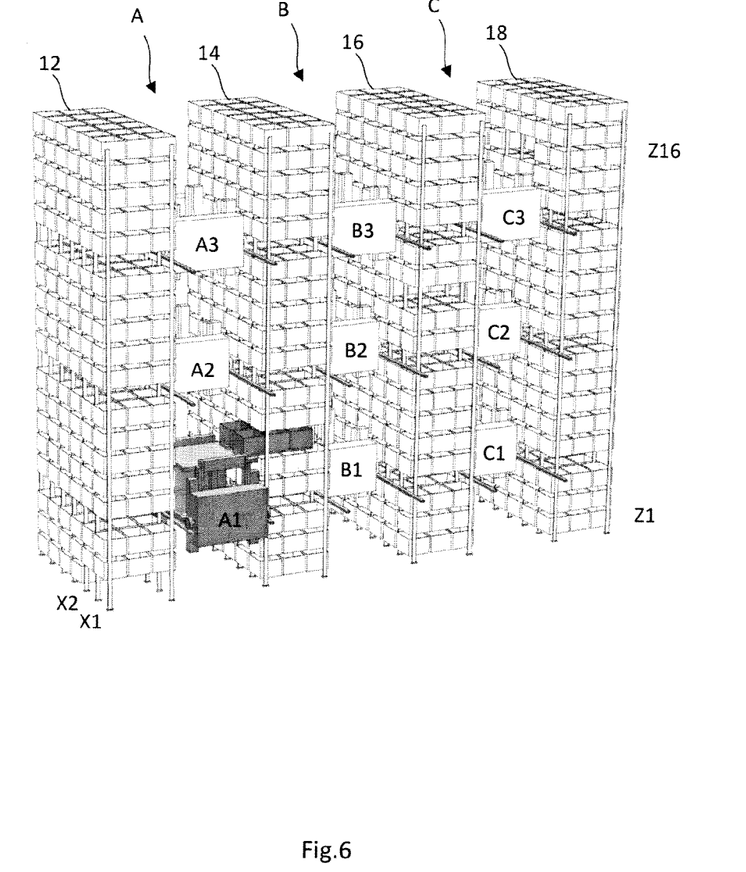
FIGS. 6-10 illustrate an exemplary transfer procedure for transferring containers from one storage slot to another storage slot.

As illustrated in FIG. 6, the platform 106 that carries 6 loaded containers may be raised to a level corresponding to row Z6 common to the first set of rows served by the transportation devices A1, B1 and C1 and the second set of rows served by the transportation devices A1, B2 and C2. Using the handling elements 112, the containers may be unloaded to 6 selected slots in the row Z6 of the storage section 14.

Figure 7:
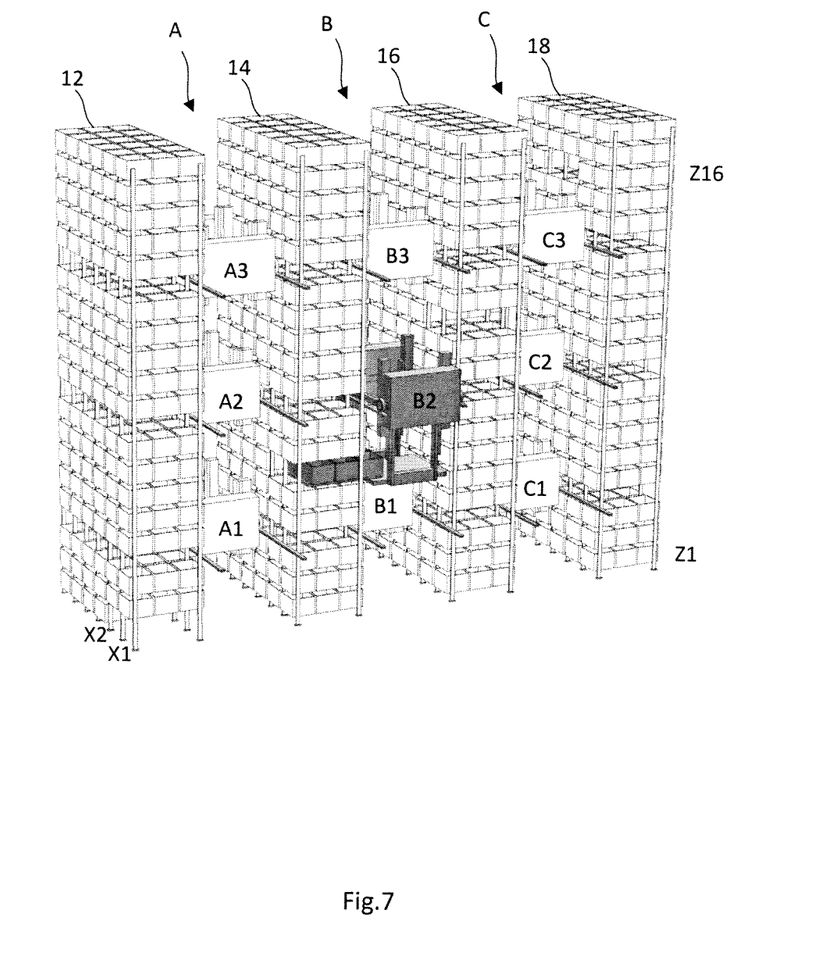

As shown in FIG. 7, the transportation device B2 is moved along the corresponding rails 20 to the position of the containers unloaded from the transportation device A1. The platform 106 is moved down to the level corresponding to the row Z6 to load the containers to the transportation device B2. To increase the speed of transfer, the transportation device B2 may be controlled to lower the platform to the row Z6 before the containers are unloaded to this row.

Figure 8:
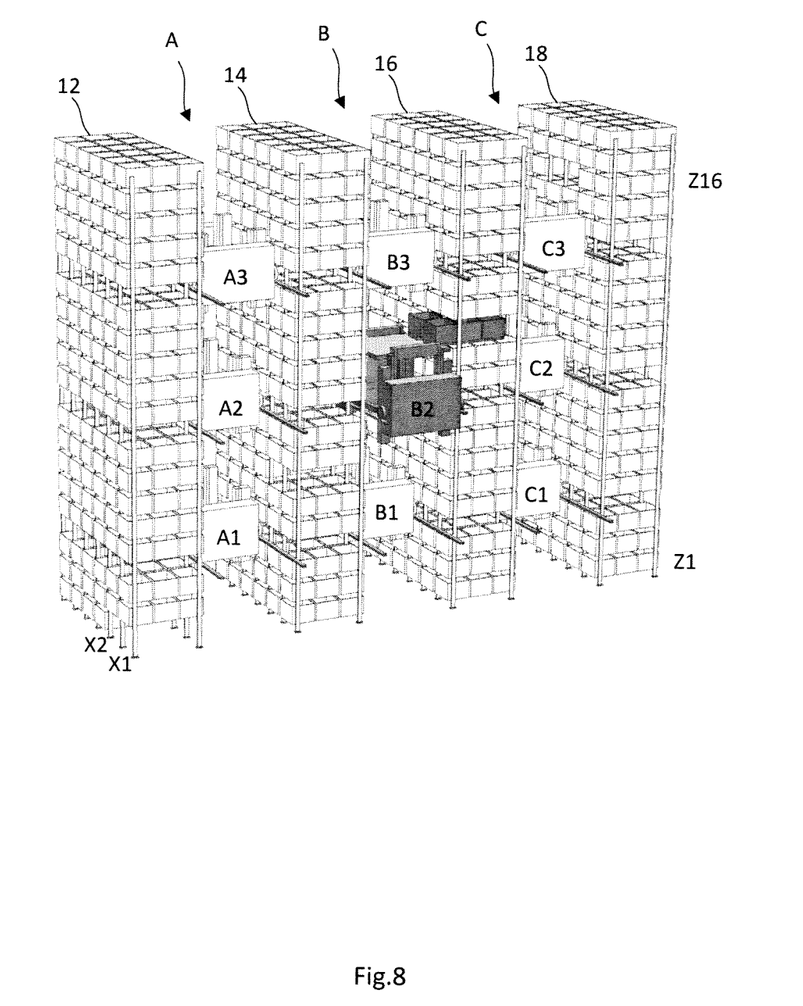

As illustrated in FIG. 8, the transportation device B2 is controlled to raise the platform 106 to a level corresponding to row Z11 common the second set of rows served by the transportation devices A2, B2 and C2 and the third set of rows served by the transportation devices A3, B3 and C3. Using the handling elements 112, the containers may be unloaded to selected slots in the row Z11 of the storage section 16.

Figure 9:
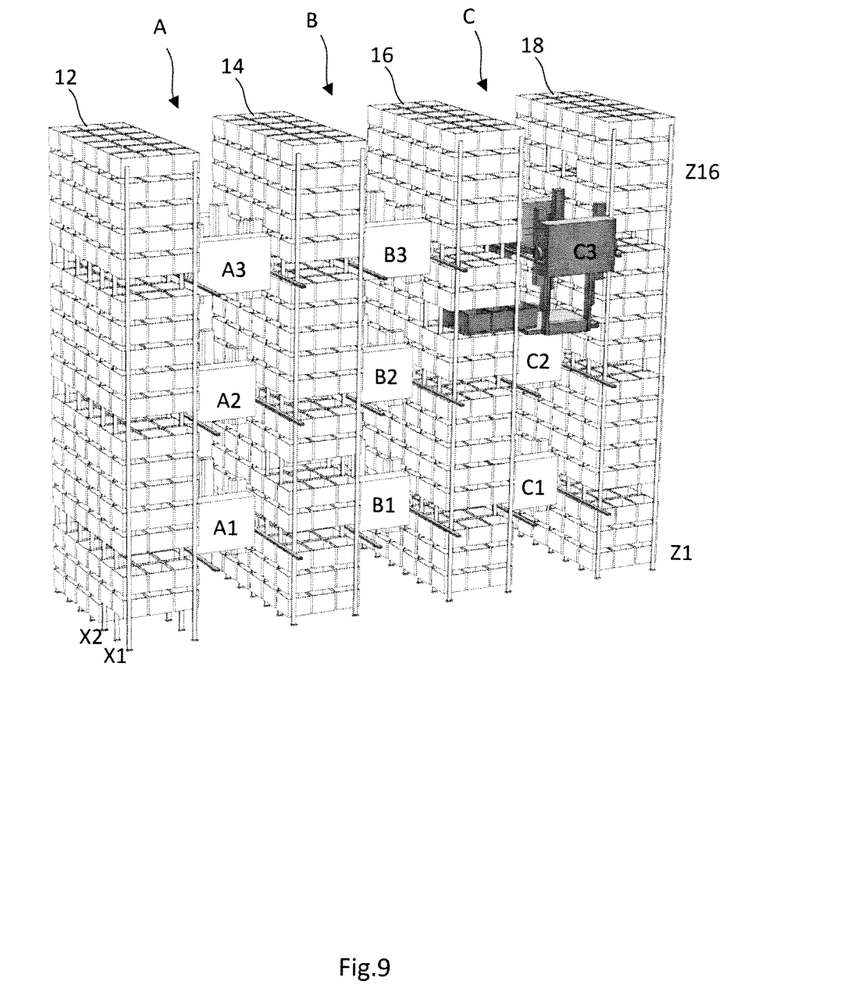

As shown in FIG. 9, the transportation device C3 is moved along the corresponding rails 20 to the position of the selected slots along the Y-axis, and the platform 106 of the transportation device C3 is lowered down to the level of the row Z11. Using the handling elements 112, the transportation device C3 loads the containers unloaded from the transportation device B2.

Figure 10:
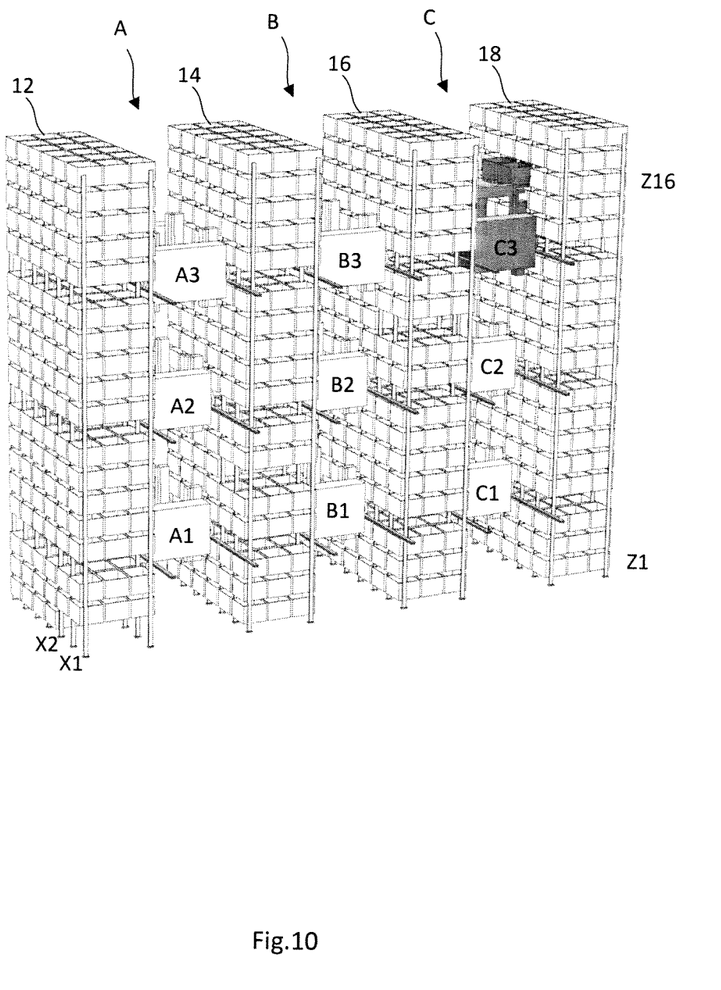

As illustrated in FIG. 10, the transportation device C3 is moved along the corresponding rails 20 to the Y position of slots selected for unloading the containers in the storage rack 18. The platform 106 of the transportation device C3 is raised to the level of the row Z16 selected for unloading the containers. The handling elements 112 are controlled to unload the containers from the platform 106 to the selected slots in the storage rack 18.

Hence, transportation devices A1, B2 and C3 interact to transfer containers from selected slots in row Z1 of the storage rack 12 to selected slots in row Z16 of the storage rack 18. In a similar manner, any selected container may be quickly transferred from one slot of any storage rack to another slot of any storage rack. The transportation devices may be controlled to perform multiple transfer procedures at the same time. The transfer procedures may be controlled by a control unit including a data processor responsive to external commands for processing the commands and producing various control signals.

The foregoing description illustrates and describes aspects of the present invention. Additionally, the disclosure shows and describes only preferred embodiments, but as aforementioned, it is to be understood that the invention is capable of use in various other combinations, modifications, and environments and is capable of changes or modifications within the scope of the inventive concept as expressed herein, commensurate with the above teachings, and/or the skill or knowledge of the relevant art.

The embodiments described hereinabove are further intended to explain best modes known of practicing the invention and to enable others skilled in the art to utilize the invention in such, or other, embodiments and with the various modifications required by the particular applications or uses of the invention. Accordingly, the description is not intended to limit the invention to the form disclosed herein.

What is claimed is:

1. A storage system comprising:
first and second storage sections, each configured for storing containers arranged in multiple rows at various horizontal levels with respect to ground, and
a first group of transportation devices configured for moving in a horizontal direction along corresponding pairs of rails arranged at multiple horizontal levels in a passage between the first storage section and the second storage section so as to have access to the containers arranged in both the first and second storage sections, wherein
each transportation device movable along a corresponding pair of rails is configured to include a container access mechanism movable up with respect to the corresponding pair of rails so as to handle one or more containers stored in a row above the corresponding pair of rails, and movable down with respect to the corresponding pair of rails so as to handle one or more containers stored in a row below the corresponding pair of rails,
the first group of transportation devices includes a first transportation device movable along a first pair of rails, and a second transportation device movable along a second pair of rails arranged above the first pair of rails,
the first transportation device is configured to access containers arranged in the first and second storage sections at a first set of rows, and the second transportation device is configured to access containers arranged in the first and second storage sections at a second set of rows provided above the rows of the first set,
the first set and the second set include a pre-determined number of rows common to the both first and second sets, the number of common rows is less than the number of rows in the first set and the number of rows in the second set.

2. The system of claim 1 further comprising a third storage section configured for storing containers arranged in multiple rows at various horizontal levels with respect to ground, and a second group of transportation devices configured for moving in a horizontal direction along corresponding pairs of rails arranged at multiple horizontal levels in a passage between the second storage section and the third storage section so as to have access to the containers arranged in both the second and the third storage sections.

3. The system of claim 2, wherein the second group of transportation devices includes a third transportation device movable along a third pair of rails arranged at a horizontal level corresponding to the first pair of rails, and a fourth transportation device movable along a fourth pair of rails arranged above the third pair of rails at a horizontal level corresponding to the second pair of rails.

4. The system of claim 3, wherein the third transportation device is configured to access containers arranged in the second and third storage sections at the first set of rows, and the fourth transportation device is configured to access containers arranged in the second and third storage sections at the second set of rows.

5. The system of claim 4, wherein the first transportation device is configured for loading a selected container from a first slot in a first row of the first storage section and unloading the selected container to a second slot in a second row of the second storage section, where the second row is a row common to the both first and second sets of rows.

6. The system of claim 5, wherein the second row differs from the first row.

7. The system of claim 6, wherein the fourth transportation device is configured for loading the selected container from the second slot and unloading the selected container to a third slot in a third row of the third storage section, where the third row differs from the second row.

8. The system of claim 1, wherein each transportation device includes a frame movable along the corresponding pair of rails and a movable platform configured to move up with respect to the frame to take a container arranged in a row above the corresponding pair of rails, and configured to move down with respect to the frame to take a container arranged in a row below the corresponding pair of rails.

9. A method of transferring containers in a storage system including multiple storage sections, each configured for storing containers arranged in multiple rows at various horizontal levels with respect to ground, and at least one group of transportation devices configured for moving in a horizontal direction along corresponding pairs of rails arranged at various horizontal levels in a passage between adjacent storage sections so as to have access to the containers arranged in the adjacent storage sections, each transportation device in the group being configured for accessing containers arranged at a set of rows, adjacent sets of rows include a predetermined number of common rows less than the number of rows in each of the adjacent sets, the method comprising:
configuring a first transportation device in a first group of transportation devices for accessing containers arranged in first and second storage section at a first set of rows, and
transferring a selected container by the first transportation device from a first row in a first set of rows in the first storage section to a second row in the second storage section common to the first set of rows and the second set of rows, where the second row differs from the first row.

10. The method of claim 9, further comprising the steps of:
configuring a second transportation device in a second group for accessing containers arranged in the second storage section and a third storage section at a second set of rows adjacent the first set of rows, and
transferring the selected container by the second transportation device from the second row in the second storage section to a third row in the third storage section.

* * * * *